A. H. COOPER.
BALL AND SOCKET PIPE COUPLING.
APPLICATION FILED JAN. 31, 1912.

1,057,939.

Patented Apr. 1, 1913.

Witnesses
R. C. Balinger.
G. Terry

Inventor
Andrew H. Cooper,
By Edwin Guthrie,
Attorney

UNITED STATES PATENT OFFICE.

ANDREW H. COOPER, OF MULBERRY, FLORIDA.

BALL-AND-SOCKET PIPE-COUPLING.

1,057,939. Specification of Letters Patent. Patented Apr. 1, 1913.

Application filed January 31, 1912. Serial No. 674,541.

*To all whom it may concern:*

Be it known that I, ANDREW H. COOPER, citizen of the United States, residing at Mulberry, in the county of Polk and State of Florida, have invented certain new and useful Improvements in Ball - and - Socket Pipe-Couplings, of which the following is a specification.

This invention relates to ball and socket pipe couplings, and has for its object the production of a joint for piping of any kind, that may be turned in any direction out of alinement with the remainder of the piping, and which comprises parts having special construction and arrangement with respect to each other whereby it is believed less frictional resistance is created to the fluid passing the joint than is met with in like couplings commonly used.

The construction and arrangement of the parts of this invention are illustrated in the accompanying drawings, of which—

Figure 1:
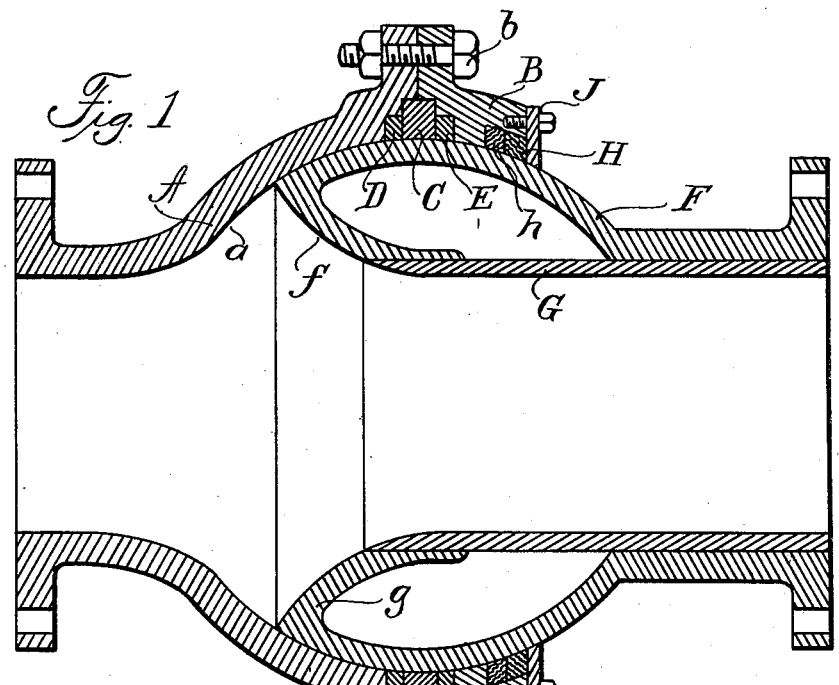
Figure 2:
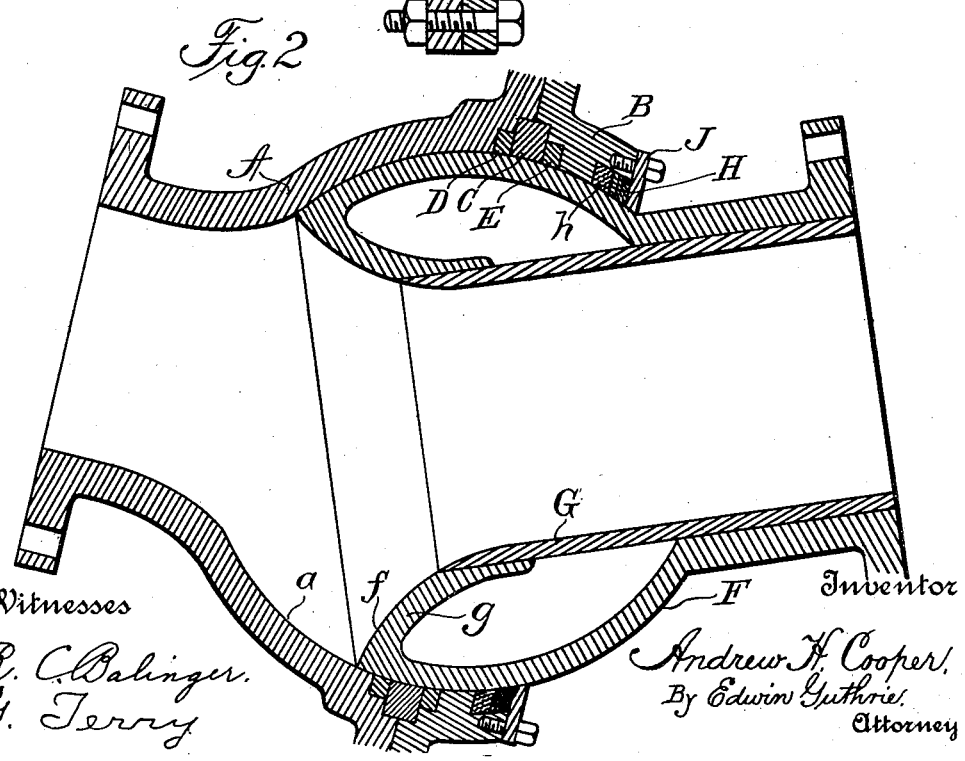

Figure 1 represents a longitudinal section of all parts and shows the outer and inner members with their axes alined. Fig. 2 is a longitudinal section of all parts showing the two members turned with respect to the positions set forth in Fig. 1.

Throughout the description and drawings, the same letter is employed to refer to the same part.

Considering the drawings, the outer member A, constituting the socket element, has the internal bell-mouth a, and a retaining ring B secured by bolts b. In a suitable cavity formed between the socket member A and the retaining ring B, by recessing both the socket member and the ring as shown, is a bull ring C, on either side of which is a ring of metal packing D and E. The packing bears against the inner or ball member F. It will be understood that when the socket member and retaining ring are clamped toward each other, the packing rings D and E are compressed against the bull ring C and against the ball member F. The ball member F has a bell-mouth $f$ formed by turning the wall of the ball F convergently inward, making the curved reëntrant flange illustrated, and the bell-mouth so formed constitutes the opening through which fluid may enter or leave the pipe lining G, located in the ball member F. The reëntrant flange is marked $g$. The reason for constructing the ball member F hollow and turning its wall inwardly into a bell-mouth is to save weight in comparatively large size joints. It would be impracticable on account of the weight to make the ball member solid. The lining G as illustrated extends into the smaller end of the bell-mouth and is made flush with the inner surface thereof, forming an unbroken continuation of the bell-mouth.

To aid in making a tight joint, the ring B that retains the ball member in place, is provided with rings of packing H and $h$, which may be of asbestos or the like. The packing rings H and $h$ are retained by the ring J. It will be noted that the packing rings H and $h$ are located in an annular recess formed in the retaining ring B, and that the recess opens upon the curved surface of the ball member F. The recess also opens exteriorly toward the right in Fig. 1, and, if the flat ring J be removed, the packing rings H and $h$ may be taken out and renewed without disconnecting the retaining ring B and the socket member A.

In the operation of this invention, the fluid passing through the coupling encounters the internal bell-mouths $a$ and $f$, and the stream takes the forms of those mouths approximately, and there is no abrupt change of the shape of the fluid passage, and no recesses internally presented to afford room for and to cause eddies in the path of the passing stream with corresponding resistance to its flow.

Having now described this invention and explained its mode of operation, what I claim is:—

In a ball and socket pipe coupling, the combination with an outer socket member, of a retaining ring and means constructed to clamp the ring and socket member together, a hollow ball member fitting said socket member and ring interiorly and arranged to be held movably in place by said ring, the wall of said member being extended convergently inward and constructed to form a bell-mouth, and the said ball member having a tubular portion extending into the smaller part of the bell mouth and forming a continuation thereof, the end of said tubular portion being formed flush with the inner surface of the bell-mouth.

In testimony whereof I affix my signature in presence of two witnesses.

ANDREW H. COOPER.

Witnesses:
  RICHARD HOUGHTON,
  JAS. F. BARGANIER.